United States Patent
Chao et al.

(10) Patent No.: US 10,388,026 B1
(45) Date of Patent: *Aug. 20, 2019

(54) FAST SCANNING LARGE FIELD-OF-VIEW DEVICES FOR DEPTH SENSING

(71) Applicant: Facebook Technologies, LLC, Menlo Park, CA (US)

(72) Inventors: Qing Chao, Redmond, WA (US); Lu Lu, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 15/643,912

(22) Filed: Jul. 7, 2017

(51) Int. Cl.
| | |
|---|---|
| *G06K 9/00* | (2006.01) |
| *G06T 7/521* | (2017.01) |
| *H04N 5/225* | (2006.01) |
| *H04N 5/235* | (2006.01) |
| *G06T 7/557* | (2017.01) |
| *G02F 1/33* | (2006.01) |
| *G02B 27/28* | (2006.01) |

(Continued)

(52) U.S. Cl.
CPC ............ *G06T 7/521* (2017.01); *G02B 27/281* (2013.01); *G02F 1/292* (2013.01); *G02F 1/33* (2013.01); *G06T 7/557* (2017.01); *H04N 5/2256* (2013.01); *H04N 5/2354* (2013.01); *G02F 2201/305* (2013.01); *G06F 3/013* (2013.01); *G06T 2207/10028* (2013.01)

(58) Field of Classification Search
None
See application file for complete search history.

(56) References Cited

U.S. PATENT DOCUMENTS

| | | | | |
|---|---|---|---|---|
| 6,052,189 A | * | 4/2000 | Fuse | G01B 11/0608 356/615 |
| 8,320,621 B2 | * | 11/2012 | McEldowney | G03B 17/54 356/5.01 |

(Continued)

OTHER PUBLICATIONS

"3D Time of Flight (ToF) Sensors—Technology Comparison," Texas Instruments Incorporated, 1995-2017, 2 pages, [Online] [Retrieved on Sep. 22, 2017] Retrieved from the Internet<URL:http://www.ti.com/lsds/ti/sensing-products/optical-sensors/3d-time-of-flight-sensors-technology-comparison.page>.

(Continued)

*Primary Examiner* — Hadi Akhavannik
(74) *Attorney, Agent, or Firm* — Fenwick & West LLP

(57) ABSTRACT

A depth camera assembly (DCA) for depth sensing of a local area. The DCA includes a structured light generator, an imaging device, and a controller. The structured light generator illuminates the local area with structured light. The structured light generator includes an acousto-optic deflector (AOD) and a liquid crystal device (LCD). The AOD functions as one or more dynamic diffraction gratings that diffract one or more optical beams to form diffracted scanning beams. The LCD includes one or more liquid crystal gratings (LCGs) that diffract the diffracted scanning beams to form the structured light projected into the local area. The imaging device captures portions of the structured light reflected from one or more objects in the local area. The controller determines depth information for the one or more objects based on the captured portions of the reflected structured light.

20 Claims, 8 Drawing Sheets

(51) Int. Cl.
*G02F 1/29* (2006.01)
*G06F 3/01* (2006.01)

(56) References Cited

U.S. PATENT DOCUMENTS

| | | | | |
|---|---|---|---|---|
| 2009/0316141 | A1* | 12/2009 | Feldkhun | G01N 21/6458 356/217 |
| 2011/0242298 | A1* | 10/2011 | Bathiche | G02B 5/045 348/54 |
| 2014/0035959 | A1* | 2/2014 | Lapstun | G02B 26/10 345/690 |
| 2014/0071456 | A1* | 3/2014 | Podoleanu | G01B 9/0209 356/497 |
| 2015/0234477 | A1* | 8/2015 | Abovitz | G06K 9/00671 382/103 |
| 2016/0139402 | A1* | 5/2016 | Lapstun | G02B 6/34 349/193 |
| 2017/0214907 | A1* | 7/2017 | Lapstun | H04N 13/302 |
| 2017/0350575 | A1* | 12/2017 | Hill | F21V 9/40 |
| 2018/0227567 | A1* | 8/2018 | Chao | H04N 13/254 |

OTHER PUBLICATIONS

"Principle of Depth Sensors," Media Research Lab, undated, 4 pages, [Online] [Retrieved on Sep. 22, 2017] Retrieved from the Internet<URL:http://homel.vsb.cz/~fus032/ano2/hct.pdf>.

Provenzano, C. et al., "Electrically Tunable Two-Dimensional Liquid Crystals Gratings Induced by Polarization Holography," Optics Express, OSA Publishing, Apr. 30, 2007, pp. 5872-5878, vol. 15, No. 9, [Online] [Retrieved on Sep. 22, 2017] Retrieved from the Internet<URL:https://doi.org/10.1364/OE.15.005872>.

Cheng, H-H. et al., "51.2 Large Angle Image Steering Using a Liquid Crystal Device," Wiley, Jun. 2014, DOI: 10.1002/j.2168-0159.2014.tb00194.x.

* cited by examiner

FAST SCANNING LARGE FIELD-OF-VIEW DEVICES FOR DEPTH SENSING

BACKGROUND

The present disclosure generally relates to depth sensing, and specifically relates to fast scanning large field-of-view devices for three-dimensional depth sensing.

To achieve a compelling user experience for depth sensing when using head-mounted displays (HMDs), it is important to create a dynamic and all solid-state light scanning device with both ultrafast scanning speed (e.g., MHz) and a large field-of-view. Usually, there are tradeoffs between speed, field-of-view and real-time reconfigurable illumination characteristics. Typically, a microelectromechanical system (MEM) with a mechanical based mirror device is used for scanning. However, the mechanical based mirror device has stability issues and has a limited scanning speed. In addition, the mechanical based mirror device is not reconfigurable in real time applications.

Most depth sensing methods rely on active illumination and detection. The conventional methods for depth sensing involve mechanical scanning or fixed diffractive-optics pattern projection, using structured light or time-of-flight techniques. Depth sensing based on time-of-flight uses a MEM with a mechanical based mirror device (scanner) to send short pulses into an object space. The depth sensing based on time-of-flight further uses a high speed detector to time-gate back-scattered light from the object to create high resolution depth maps. However, the mechanical based scanner performs inadequately in scanning speed, real-time reconfiguration and mechanical stability. The scanning speed is limited to a few kHz in the fast axis and a few hundred Hz in the slow axis. In addition, the mechanical based scanner has stability and reliability issues. Depth sensing based on a fixed structured light uses a diffractive optical element to generate a fixed structured light projected into an object space. The depth sensing based on the fixed structured light further uses a pre-stored look-up table to compute and extract depth maps. However, the depth sensing based on the fixed structured light and the diffractive optical element is not robust enough for dynamic depth sensing.

SUMMARY

A depth camera assembly (DCA) determines depth information associated with one or more objects in a local area. The DCA comprises a structured light generator, an imaging device and a controller. The structured light generator is configured to illuminate the local area with structured light (e.g., dots, lines, etc.) in accordance with emission instructions. The structured light generator comprises an illumination source, an acousto-optic deflector (AOD), a liquid crystal device (LCD), and a projection assembly. The illumination source is configured to emit one or more optical beams. The AOD generates diffracted scanning beams (in one or two dimensions) from the one or more beams emitted from the illumination source. The AOD is configured to function as one or more dynamic diffraction gratings that diffract the one or more optical beams to form the diffracted scanning beams based in part on the emission instructions. In one embodiment, the AOD includes a single acousto-optic device for generating one-dimensional scanning beams. In an alternate embodiment, the AOD includes at least one pair of acousto-optic devices whose axes of orientation are orthogonal to each other. Accordingly, one acousto-optic device in a pair of acousto-optic devices diffracts light in one dimension (e.g., x) and the second acousto-optic device in the pair diffracts the x-diffracted light along an orthogonal dimension (e.g., y), thereby generating the diffracted scanning beams as two-dimensional scanning beams for two-dimensional random scanning. The LCD includes one or more liquid crystal gratings (LCGs). Each LCG is configured to diffract the diffracted scanning beams and expand scanning angles of the scanning beams based in part on the emission instructions to generate the structured light for scanning the local area with a wide field-of-view. The projection assembly is configured to project the structured light into the local area. The imaging device is configured to capture portions of the structured light reflected from one or more objects in the local area. The controller may be coupled to both the structured light generator and the imaging device. The controller generates the emission instructions and provides the emission instructions to the structured light generator. The controller is also configured to determine depth information for the one or more objects based at least in part on the captured portions of the reflected structured light.

A head-mounted display (HMD) can further integrate the DCA. The HMD further includes an electronic display and an optical assembly. The HMD may be, e.g., a virtual reality (VR) system, an augmented reality (AR) system, a mixed reality (MR) system, or some combination thereof. The electronic display is configured to emit image light. The optical assembly is configured to direct the image light to an exit pupil of the HMD corresponding to a location of a user's eye, the image light comprising the depth information of the one or more objects in the local area determined by the DCA.

Figure 1:
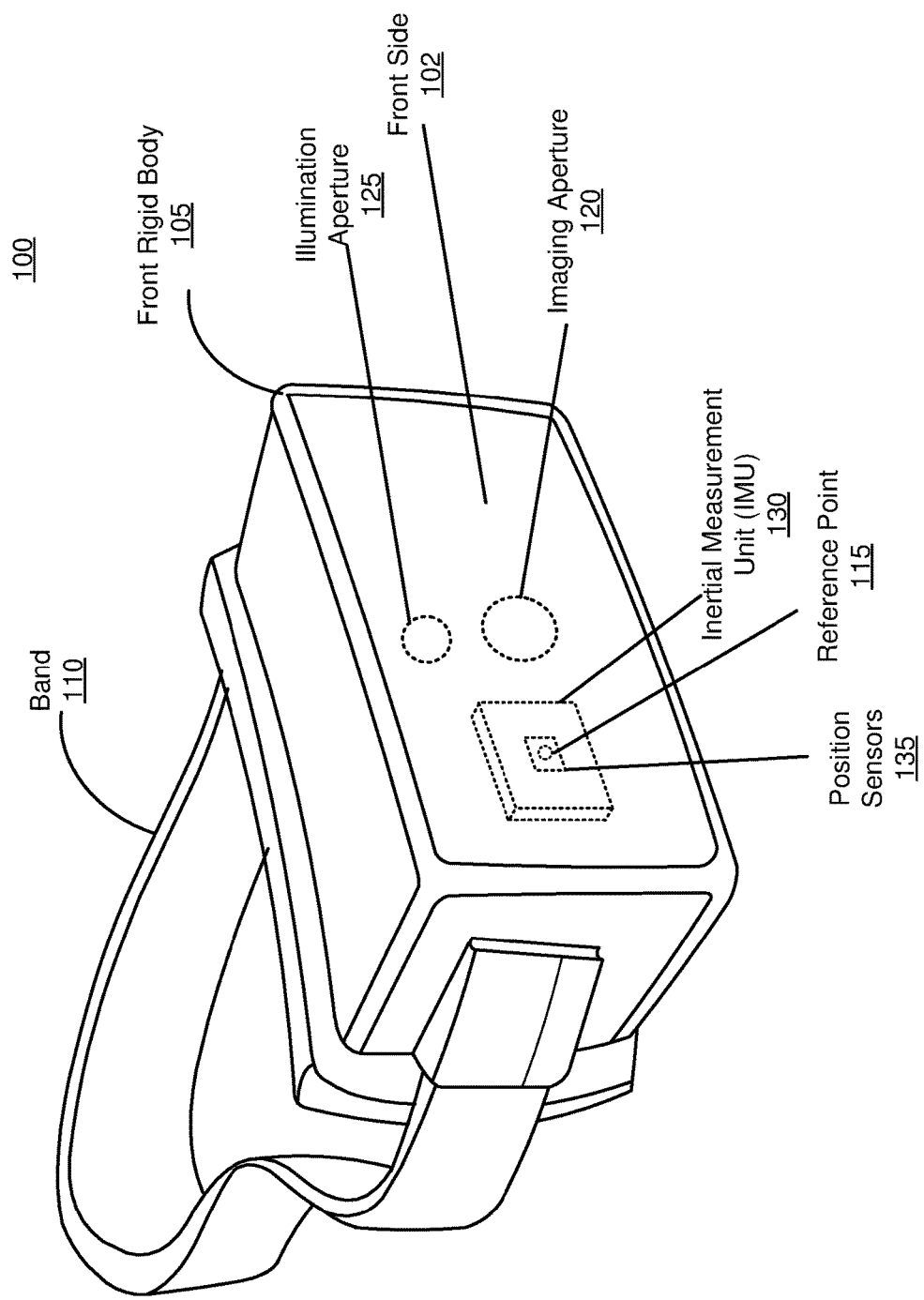
FIG. 1 is a diagram of a head-mounted display (HMD), in accordance with an embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A depth camera assembly (DCA) for determining depth information of objects in a local area surrounding some or all of the DCA. The DCA includes a structured light source, one or more cameras, and a controller. The structured light source includes a laser source and an acousto-optic deflector (AOD) that actively scans one or more light beams emitted from the laser source and generates scanning beams as structured light. The structured light is light used for depth sensing of one or more objects in the local area. The structured light can include light of a defined pattern, e.g., a dot pattern, a line pattern, etc., suitable for depth sensing based on structured illumination pattern methods. The structured light can also include diffuse light. The diffuse light can be used for depth sensing based on time-of-flight methods. The structured light presented in this disclosure can be also used for depth sensing based on the combination of structured illumination pattern and time-of-flight methods. The AOD can be composed of one or more acousto-optic devices. Each acousto-optic device can be configured to diffract incident light by a specific diffraction angle controlled by, e.g., an electric field applied to the acousto-optic device. In one embodiment, the AOD includes a single acousto-optic device for generating one-dimensional scanning beams. In an alternate embodiment, the AOD includes at least one pair of acousto-optic devices whose axes of orientation are orthogonal to each other, suitable for generating two-dimensional scanning beams. The structured light source also includes one or more liquid crystal gratings (LCGs) that expand scanning angles of the scanning beams to achieve a wide field-of-view when the scanning beams are projected as the structured light into the local area. The one or more cameras capture portions of the structured light reflected from the objects in the local area. Note that the portions of the structured light can be also scattered from one or more objects in the local area, wherein scattering represents a form of diffuse reflection. The controller determines depth information based on the captured portions of the reflected structured light. The controller determines the depth information based on at least one of structured illumination pattern depth sensing information and time-of-flight depth sensing information.

In some embodiments, the DCA is integrated into a head-mounted display (HMD) that captures data describing depth information in a local area surrounding some or all of the HMD. The HMD may be part of, e.g., a virtual reality (VR) system, an augmented reality (AR) system, a mixed reality (MR) system, or some combination thereof. The HMD further includes an electronic display and an optical assembly. The electronic display is configured to emit image light. The optical assembly is configured to direct the image light to an exit pupil of the HMD corresponding to a location of a user's eye, the image light comprising the depth information of the objects in the local area determined by the DCA.

FIG. 1 is a diagram of a HMD 100, in accordance with an embodiment. The HMD 100 may be part of, e.g., a VR system, an AR system, a MR system, or some combination thereof. In embodiments that describe AR system and/or a MR system, portions of a front side 102 of the HMD 100 are at least partially transparent in the visible band (~380 nm to 750 nm), and portions of the HMD 100 that are between the front side 102 of the HMD 100 and an eye of the user are at least partially transparent (e.g., a partially transparent electronic display). The HMD 100 includes a front rigid body 105, a band 110, and a reference point 115. The HMD 100 also includes a DCA configured to determine depth information of a local area surrounding some or all of the HMD 100. The HMD 100 also includes an imaging aperture 120 and an illumination aperture 125, and an illumination source of the DCA emits light (e.g., structured light) through the illumination aperture 125. An imaging device of the DCA captures light from the illumination source that is reflected from the local area through the imaging aperture 120. Light emitted from the illumination source of the DCA through the illumination aperture 125 comprises structured light, as discussed in more detail in conjunction with FIGS. 2-7. Light reflected from the local area through the imaging aperture 120 and captured by the imaging device of the DCA comprises portions of the reflected structured light, as also discussed in more detail in conjunction with FIGS. 2-3.

The front rigid body 105 includes one or more electronic display elements (not shown in FIG. 1), one or more integrated eye tracking systems (not shown in FIG. 1), an Inertial Measurement Unit (IMU) 130, one or more position sensors 135, and the reference point 115. In the embodiment shown by FIG. 1, the position sensors 135 are located within the IMU 130, and neither the IMU 130 nor the position sensors 135 are visible to a user of the HMD 100. The IMU 130 is an electronic device that generates fast calibration data based on measurement signals received from one or more of the position sensors 135. A position sensor 135 generates one or more measurement signals in response to motion of the HMD 100. Examples of position sensors 135 include: one or more accelerometers, one or more gyroscopes, one or more magnetometers, another suitable type of sensor that detects motion, a type of sensor used for error correction of the IMU 130, or some combination thereof. The position sensors 135 may be located external to the IMU 130, internal to the IMU 130, or some combination thereof.

Figure 2:
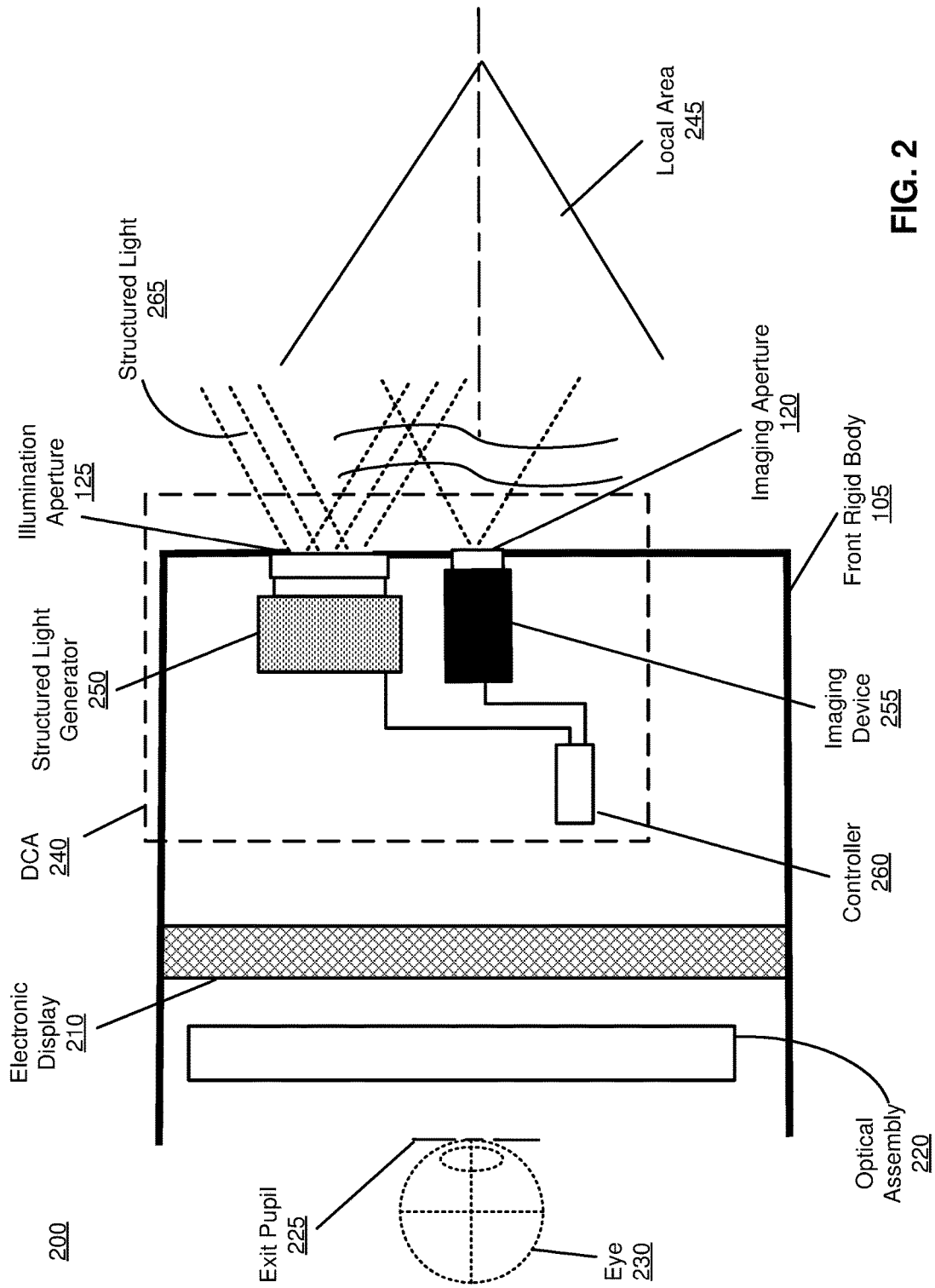
FIG. 2 is a cross section of a front rigid body of the HMD in FIG. 1, in accordance with an embodiment.

FIG. 2 is a cross section 200 of the front rigid body 105 of the HMD 100 shown in FIG. 1. As shown in FIG. 2, the front rigid body 105 includes an electronic display 210 and an optical assembly 220 that together provide image light to an exit pupil 225. The exit pupil 225 is a region in space that would be occupied by a user's eye 230. In some cases, the exit pupil 225 may also be referred to as an eye-box. For purposes of illustration, FIG. 2 shows a cross section 200 associated with a single eye 230, but another optical assembly 220, separate from the optical assembly 220, provides altered image light to another eye of the user. The front rigid body 105 also has an optical axis corresponding to a path along which image light propagates through the front rigid body 105.

The electronic display 210 generates image light. In some embodiments, the electronic display 210 includes an optical element that adjusts the focus of the generated image light. The electronic display 210 displays images to the user in accordance with data received from a console (not shown in FIG. 2). In various embodiments, the electronic display 210 may comprise a single electronic display or multiple electronic displays (e.g., a display for each eye of a user). Examples of the electronic display 210 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 210 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical assembly 220 magnifies received light from the electronic display 210, corrects optical aberrations associated with the image light, and the corrected image light is presented to a user of the HMD 100. At least one optical element of the optical assembly 220 may be an aperture, a Fresnel lens, a refractive lens, a reflective surface, a diffractive element, a waveguide, a filter, or any other suitable optical element that affects the image light emitted from the electronic display 210. Moreover, the optical assembly 220 may include combinations of different optical elements. In some embodiments, one or more of the optical elements in the optical assembly 220 may have one or more coatings, such as anti-reflective coatings, dichroic coatings, etc. Magnification of the image light by the optical assembly 220 allows elements of the electronic display 210 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the user's field-of-view. In some embodiments, the optical assembly 220 is designed so its effective focal length is larger than the spacing to the electronic display 210, which magnifies the image light projected by the electronic display 210. Additionally, in some embodiments, the amount of magnification may be adjusted by adding or removing optical elements.

As shown in FIG. 2, the front rigid body 105 further includes a DCA 240 for determining depth information of one or more objects in a local area 245 surrounding some or all of the HMD 100. The DCA 240 includes a structured light generator 250, an imaging device 255, and a controller 260 that may be coupled to both the structured light generator 250 and the imaging device 255. The structured light generator 250 emits light through the illumination aperture 125. In accordance with embodiments of the present disclosure, the structured light generator 250 is configured to illuminate the local area 245 with structured light 265 in accordance with emission instructions generated by the controller 260. The controller 260 is configured to control operation of certain components of the structured light generator 250, based on the emission instructions. The controller 260 provides the emission instructions to a plurality of diffractive optical elements of the structured light generator 250 to control a field-of-view of the local area 265 illuminated by the structured light 265. More details about controlling the plurality of diffractive optical elements of the structured light generator 250 by the controller 260 are disclosed in conjunction with FIGS. 3-7.

The structured light generator 250 may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the structured light generator 250 can emit one or more light beams. More details about the DCA 240 that includes the structured light generator 250 are disclosed in conjunction with FIG. 3.

The imaging device 255 includes one or more cameras configured to capture, through the imaging aperture 120, portions of the structured light 265 reflected from the local area 245. The imaging device 255 captures one or more images of one or more objects in the local area 245 illuminated with the structured light 265. The controller 260 is also configured to determine depth information for the one or more objects based on the captured portions of the reflected structured light. In some embodiments, the controller 260 provides the determined depth information to a console (not shown in FIG. 2) and/or an appropriate module of the HMD 100 (e.g., a varifocal module, not shown in FIG. 2). The console and/or the HMD 100 may utilize the depth information to, e.g., generate content for presentation on the electronic display 210.

In some embodiments, the front rigid body 105 further comprises an eye tracking system (not shown in FIG. 2) that determines eye tracking information for the user's eye 230. The determined eye tracking information may comprise information about an orientation of the user's eye 230 in an eye-box, i.e., information about an angle of an eye-gaze. An eye-box represents a three-dimensional volume at an output of a HMD in which the user's eye is located to receive image light. In one embodiment, the user's eye 230 is illuminated with structured light. Then, the eye tracking system can use locations of the reflected structured light in a captured image to determine eye position and eye-gaze. In another embodiment, the eye tracking system determines eye position and eye-gaze based on magnitudes of image light captured over a plurality of time instants.

In some embodiments, the front rigid body 105 further comprises a varifocal module (not shown in FIG. 2). The varifocal module may adjust focus of one or more images displayed on the electronic display 210, based on the eye tracking information. In one embodiment, the varifocal module adjusts focus of the displayed images and mitigates vergence-accommodation conflict by adjusting a focal distance of the optical assembly 220 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 260 to generate content for presentation on the electronic display 210.

Figure 3:
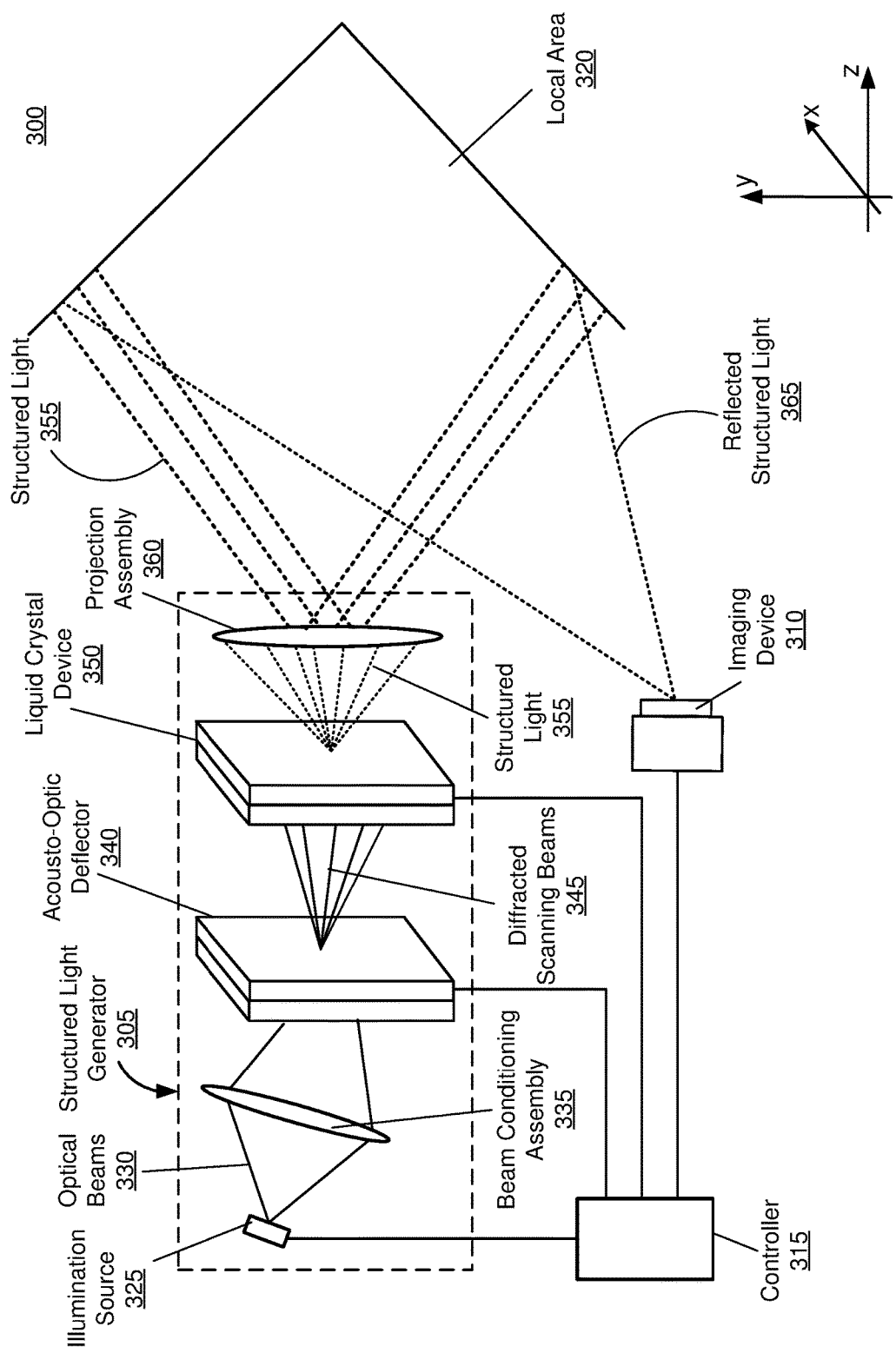
FIG. 3 is an example depth camera assembly (DCA), in accordance with an embodiment.

FIG. 3 is an example DCA 300, in accordance with an embodiment. The DCA 300 is configured for depth sensing over a large field-of-view using a structure light pattern. The DCA 300 includes a structured light generator 305, an imaging device 310, and a controller 315 coupled to both the structured light generator 305 and the imaging device 310. The DCA 300 may be configured to be a component of the HMD 100 in FIG. 1. Thus, the DCA 300 may be an embodiment of the DCA 240 in FIG. 2; the structured light generator 305 may be an embodiment of the structured light generator 250 in FIG. 2; and the imaging device 310 may be an embodiment of the imaging device 255 in FIG. 2.

The structured light generator 305 is configured to illuminate and scan a local area 320 with structured light in accordance with emission instructions from the controller 315. The structured light generator 305 includes an illumination source 325 (e.g., laser diode) configured to emit one or more optical beams 330. The illumination source 325 may directly generate the one or more optical beams 330 as polarized light. The one or more optical beams 330 can be circularly polarized (right handed or in other embodiments left handed). In alternate embodiments, the one or more optical beams 330 can be linearly polarized (vertical and horizontal), or elliptically polarized (right or left). Alternatively, the illumination source 325 may emit unpolarized light, and a polarizing element (not shown in FIG. 3) separate from the illumination source 325 may generate the one or more optical beams 330 as polarized light, based in part on the emission instructions from the controller 315. The polarizing element may be integrated into the illumination source 325 or placed in front of the illumination source 325. In some embodiments, for depth sensing based on time-of-flight, the one or more optical beams 330 are temporally modulated for generating temporally modulated illumination of the local area 320.

A beam conditioning assembly 335 collects light from the illumination source 325 and directs it toward a portion of an AOD 340. The beam conditioning assembly 335 is composed of one or more optical elements (lenses). The AOD 340 diffracts light into one or more dimensions. The AOD 340 is composed of one or more acousto-optic devices that generate diffracted scanning beams 345 in one or two dimensions by diffracting the one or more optical beams 330. The diffracted scanning beams 345 may include first order diffracted scanning beams. Alternatively, the diffracted scanning beams 345 may include diffracted scanning beams of an order higher than the first order. The diffracted scanning beams 345 represent structured light of a defined pattern, e.g., a dot pattern for scanning the local area 320. In some embodiments, each acousto-optic device in the AOD 340 is configured to function as a dynamic diffraction grating that diffracts the one or more optical beams 330 to form the diffracted scanning beams 345 based in part on emission instructions from the controller 315. Each acousto-optic device in the AOD 340 may include a transducer or an array of transducers and one or more diffraction areas (not shown in FIG. 3). Responsive to at least one radio frequency in the emission instructions, the transducer or the array of transducers of the acousto-optic device in the AOD 340 may be configured to generate at least one sound wave in the one or more diffraction areas of the acousto-optic device to form the dynamic diffraction grating.

The AOD 340 can be configured to actively scan a plurality of diffraction angles at which the one or more optical beams 330 are diffracted and interfered to form the diffracted scanning beams 345. The AOD 340 is configured to scan the plurality of diffraction angles along one or two dimensions between, e.g., −5 degrees and +5 degrees. In this way, the diffracted scanning beams 345 formed by the AOD 340 covers a scanning zone with a field-of-view of, e.g., 10 degrees, along one or two dimensions. In some embodiments, the AOD 340 is configured to scan the plurality of diffraction angles with the scanning resolution of 0.1 degree, thus supporting a fine-grained scanning. Due to a relatively narrow scanning zone, the AOD 340 can support fast scanning with scanning speeds, e.g., in the order of MHz.

The acousto-optic deflector 340 can be used to scan the local area 320 at discrete angles or a continuum of angles, depending on a radio frequency signal that drives the acousto-optic deflector 340, controlled by, e.g., the controller 315. In some embodiments, to achieve scanning of discrete angles (e.g., 0, +x, and −x degrees along x dimension, and 0, +y, −y degrees along y dimension), each acousto-optic device in the acousto-optic deflector 340 is driven by a specific radio frequency signal having a frequency of, e.g., $f_c$, $f_c+f_m$, $f_c-f_m$, for scanning of discrete angles along a corresponding dimension. In one or more embodiments, an angle of light incident to each acousto-optic device in the acousto-optic deflector 340 satisfies the Bragg matching condition. Note that $f_c$ is a frequency of a carrier signal and $f_m$ is a frequency of a modulation signal that modulates the carrier signal for generating the radio frequency signal that drives an acousto-optic device within the acousto-optic deflector 340. The frequency of carrier signal, $f_c$, can be set to be around a center of a frequency bandwidth of the acousto-optic deflector 340 in order to maximize the diffraction efficiency of the diffracted scanning beams 345. In addition, the value of $2f_m$ should be smaller than an acoustic resonant 3 dB frequency bandwidth of each acousto-optic device within the acousto-optic deflector 340. Note also that the frequency bandwidth of the acousto-optic deflector 340 is relatively narrow, providing a relatively narrow angular spread (band) in the Bragg regime for the diffracted scanning beams 345. In alternate embodiments, to achieve fast scanning of a continuum of angles (e.g., with resolution smaller than 0.1 degrees, along both x and y dimensions), each acousto-optic device of the acousto-optic deflector 340 is driven by a frequency sweep signal (e.g., controlled by the controller 315) that performs frequency sweep during a short time duration. For example, the frequency sweep signal may cover frequencies from $f_c-f_m$ to $f_c+f_m$ with a defined frequency resolution of $\Delta f_m$ that is related to a time bandwidth product of an acousto-optic device of the acousto-optic deflector 340.

In some embodiments, a radio frequency driving power of the AOD 340 controlled by the controller 315 can be up to 500 mW, and a driving radio frequency controlled by the controller 315 can be in the range of a few MHz up to GHz. Resolution of the diffracted scanning beams 345 can be, e.g., up to 5000 resolvable spots in x dimension and y dimension. In one embodiment, the AOD 340 is configured as a diffraction grating device having an array of transducers. In an alternate embodiment, the AOD 340 is configured as a diffraction grating device having a single transducer. The AOD 340 represents a dynamic phase grating suitable for achieving both dynamic and high speed scanning, based on a sound wave traveling through a crystal that diffracts the one or more optical beams 330 and creates the diffracted scanning beams 345 as a real-time configurable structured light. In some embodiments, the AOD 340 can accept the one or more optical beams 330 having visible to infrared wavelengths. In some embodiments, efficiency of the AOD 340 depends on a bandwidth of each transducer in the AOD 340, which can be designed to maintain efficiency between, e.g., 80% and 90%.

In some embodiments, the one or more optical beams 330 are incident on the AOD 340 at an angle that satisfies the Bragg matching condition. The AOD 340 may directly generate the diffracted scanning beams 345 as polarized light (e.g., circularly polarized light) by orienting the one or more optical beams 330 to a crystal in the AOD 340 in a geometry satisfying the Bragg matching condition. Note that the diffracted scanning beams 345 can be either right handed circularly polarized or left handed circularly polarized based on the crystal in the AOD 340. In some embodiments, a state of polarization (SOP) of the one or more optical beams 330 incident to the AOD 340 matches an eigenstate of polarization at the Bragg angle for achieving maximum diffraction efficiency of the AOD 340. A polarization element can be included in front of the AOD 340 (not shown in FIG. 3) to maximize the diffraction efficiency of the AOD 340, if the SOP of the one or more optical beams 330 does not match the eigenstate of polarization at the Bragg angle for phase matching condition.

The AOD 340 provides ultrafast scanning speed to dynamically scan arbitrary patterns that can be projected to one or more objects in the local area 320. The AOD 340 operates based on one or more different crystal types, each crystal type having a wide spectral bandwidth and being transparent for light from visible to infrared wavelengths. Hence, the AOD 340 can diffract the one or more optical beams 330 in a wide wavelength range. Depending on a configuration of the HMD 100, the AOD 340 can be implemented as a different type of device. In one embodiment, the AOD 340 is implemented as a bulk device. In another embodiment, the AOD 340 is implemented as a plate device, i.e., a compact version of a bulk device. In yet another embodiment, the AOD 340 is implemented as a thin film device based on a surface propagating acoustic wave deflector. Depending on a type of scanning required, the AOD 340 may include a different number of acousto-optic devices or elements. In one embodiment, the AOD 340 includes a single acousto-optic device or element for generating the diffracted scanning beams 345 as one-dimensional scanning beams for one-dimensional random scanning. In an alternate embodiment, the AOD 340 includes at least one pair of acousto-optic devices whose axes of orientation are orthogonal to each other. Accordingly, one acousto-optic device in a pair of acousto-optic devices diffracts light in one dimension (e.g., x) and the second acousto-optic device in the pair diffracts the x-diffracted light along an orthogonal dimension (e.g., y), thereby generating the diffracted scanning beams 345 as two-dimensional scanning beams for two-dimensional random scanning. Each acousto-optic device or element in the AOD 340 can be configured to function as a dynamic diffraction grating that diffracts incident light by a specific diffraction angle based in part on the emission instructions from the controller 315. More details about a structure of the AOD 340 in different configurations of the structured light generator 305 are disclosed in conjunction with FIGS. 4A-4B, FIGS. 5A-5B, FIGS. 6A-6B. Additional details regarding operation of an acousto-optic device is described with regard to U.S. app. Ser. No. 15/599,353, filed on May 18, 2017, which is incorporated by reference in its entirety.

The diffracted scanning beams 345 generated by the AOD 340 can be scanned at, e.g., MHz speed. The diffracted scanning beams 345 having a fast scanning speed are then propagated to a plate or thin film liquid crystal device (LCD) 350 positioned in front of the AOD 340 for expanding a field-of-view and achieving dynamic illumination.

The LCD 350 diffracts the diffracted scanning beams 345 generated by the AOD 340, based in part on the emission instructions from the controller 315. The LCD 350 expands scanning angles of the diffracted scanning beams 345 to achieve a wide field-of-view for scanning the local area 320. Thus, the LCD 350 generates, by diffracting the diffracted scanning beams 345, structured light 355 covering a large scanning field of the local area 320, e.g., N degrees along both x dimension and y dimension, where N is at least a factor of 5 times larger than an angular spread (band) of the AOD 340. Note that an angular spread of the LCD 350 (and of the AOD 340) does not need to be symmetric along x and y dimensions. For example, the LCD 350 may provide a larger diffraction angle in x dimension than in y dimension (and vice versa).

The LCD 350 actively increases scanning angles of the diffracted scanning beams 345 to, e.g., 60 degrees along both x dimension and y dimension, with a scanning speed in the order of, e.g., MHz. Therefore, the AOD 340 essentially creates a high speed dynamic scanning, whereas the LCD 350 creates directional carrier signals to expand a field-of-view and/or enable bi-directional dynamic scanning of the local area 320. In other words, the AOD 340 provides a high resolution signal (i.e., the diffracted scanning beams 345) embedded into a directional carrier provided by the LCD 350 to achieve fast scanning with a large field-of-view. In some embodiments, illumination characteristics of the structured light 355 that scans the local area 320 can be re-configured at a video rate, e.g., based in part on the emission instructions from the controller 315 provided to the AOD 340 and/or the LCD 350. It should be understood that the structured light 355 with a large field-of-view can be generated by the DCA 300 having a reverse order of the AOD 340 and the LCD 350 where the AOD 340 is positioned in front of the LCD 350 (not shown in FIG. 3).

The LCD 350 includes one or more LCGs in an optical series. Each LCG within the LCD 350 is configured to further diffract the diffracted scanning beams 345 by a specific diffraction angle, which can be controlled based in part on the emission instructions from the controller 315. In some embodiments, each LCG within the LCD 350 can be made based on the photo-alignment method with liquid crystal polymers and a polarization holography setup. The diffraction efficiency of, e.g., 30 degrees LCG within the LCD 350 is typically high, e.g., approximately 95% for diffracting light having wavelengths of 850 nm or 1050 nm. The diffraction efficiency of, e.g., 30 degrees LCG within the LCD 350 over a narrow banded incident light (e.g., 850 nm+/−15 nm) can be optimized to, e.g., 95% by using dual twist or multiple twisted structures. More details about a structure of the LCD 350 in different configurations of the structured light generator 305 are disclosed in conjunction with FIGS. 4A-4B, FIGS. 5A-5B, FIGS. 6A-6B.

A projection assembly 360 is positioned in front of the combination of the AOD 340 and the LCD 350. The projection assembly 360 includes one or more optical elements (lenses). Optionally, the projection assembly 360 may include a polarizing element for polarization of the structured light 355. The structured light 355 may be selected from a group consisting of linearly polarized light (vertical and horizontal), right handed circularly polarized light, left handed circularly polarized light, and elliptically polarized light. The projection assembly 360 projects the structured light 355 into the local area 320 over a wide field-of-view. The structured light 355 illuminates portions of the local area 320, including one or more objects in the local area 320. A reflected structured light 365 is generated based on reflection of the structured light 355 from the one or more objects in the local area 320.

The imaging device 310 captures one or more images of the one or more objects in the local area 320 by capturing the portions of the reflected structured light 365. In one embodiment, the imaging device 310 is an infrared camera configured to capture images in an infrared spectrum. In another embodiment, the imaging device 310 is configured to capture an image light of a visible spectrum. The imaging device 310 can be configured to operate with a frame rate in the range of kHz to MHz for fast detection of objects in the local area 320. The imaging device 310 includes a polarizing element (not shown in FIG. 3) placed in front of a camera for receiving and propagating the reflected structured light 365 of a particular polarization. The reflected structured light 365 may be selected from a group consisting of linearly polarized light (vertical and horizontal), right handed circularly polarized light, left handed circularly polarized light, and elliptically polarized light. It should be noted that polarization of the reflected structured light 365 can be different than polarization of the structured light 355 that illuminates the local area 320. In some embodiments, the imaging device 310 includes more than one camera. In one embodiment, for depth sensing methods based on structured light illumination pattern, the imaging device 310 includes a two-dimensional detector pixel array. In another embodiment, for depth sensing methods based on time-of-flight, the imaging device 310 includes a photodetector having one or more pixels. Each pixel in the photodetector of the imaging device 310 may include a multiple storage bins, and the imaging device 310 can be configured to store charge in each storage bin for a particular amount of time.

The controller 315 is controls operations of various components of the DCA 300 in FIG. 3. In some embodiments, the controller 315 provides emission instructions to the illumination source 325 to control intensity of the one or more optical beams 330, modulation of the one or more optical beams 330, a time duration during which the illumination source 325 is activated, etc. The controller 315 may further create the emission instructions which include a radio frequency at which the AOD 340 is driven. The controller 315 may generate the emission instructions based on, e.g., a predetermined list of values for the radio frequency stored in a look-up table of the controller 315. In an embodiment, the predetermined radio frequencies are stored as waveforms in an electronic chip, e.g., in a direct digital synthesizer (not shown in FIG. 3) coupled to the controller 315. In another embodiment, the emission instructions are created by a voice control integrated into the controller 315. Upon a verbal request, the voice control of the controller 315 computes a radio frequency for driving the AOD 340 to generate the diffracted scanning beams 345 and the structured light 355 of a specific spatial frequency suitable for detection of stationary object(s) and/or tracking of moving object(s) in the local area 320 at a certain distance from the imaging device 310.

The controller 315 can modify the radio frequency at which the AOD 340 is driven to adjust a diffraction angle at which the one or more optical beams 330 are diffracted. In this way, the controller 315 can instruct the AOD 340 to scan a plurality of diffraction angles at which the one or more optical beams 330 are diffracted and interfered to form the diffracted scanning beams 345 and the structured light 355. A radio frequency at which the AOD 340 is driven controls a separation of the optical beams 330 diffracted by the AOD 340. Hence, a spatial frequency of the resulting diffracted scanning beams 345 (and of the structured light 355) directly depends on the radio frequency at which the AOD 340 is driven.

As shown in FIG. 3, the controller 315 is further coupled to the imaging device 310 and can be configured to determine depth information for the one or more objects in the local area 320. The controller 315 determines depth information for the one or more objects based at least in part on the captured portions of the reflected structured light 365. In some embodiments, the controller 315 can be configured to determine the depth information based on polarization information of the reflected structured light 365 and polarization information of the structured light 355. In one embodiment, for a depth sensing method based on structured light illumination pattern, the controller 315 is configured to determine the depth information based on phase-shifted patterns of the portions of the reflected structured light 365 distorted by shapes of the one or more objects in the local area 320, and to use triangulation calculation to obtain a depth map of the local area 320. In another embodiment, for a depth sensing method based on time-of-flight, the controller 315 is configured to determine depth information using a ratio of charges stored in storage bins associated with each pixel in the photodetector of the imaging device 310. In this case, the imaging device 310 can be configured to store charge in each storage bin associated with an intensity of received light for a particular amount of time. In yet another embodiment, the controller 315 is configured to determine the depth information from the reflected structured light 365 based on time-of-flight information and information about a pattern of the reflected structured light 365 distorted by shapes of the one or more objects.

Figure 4A:
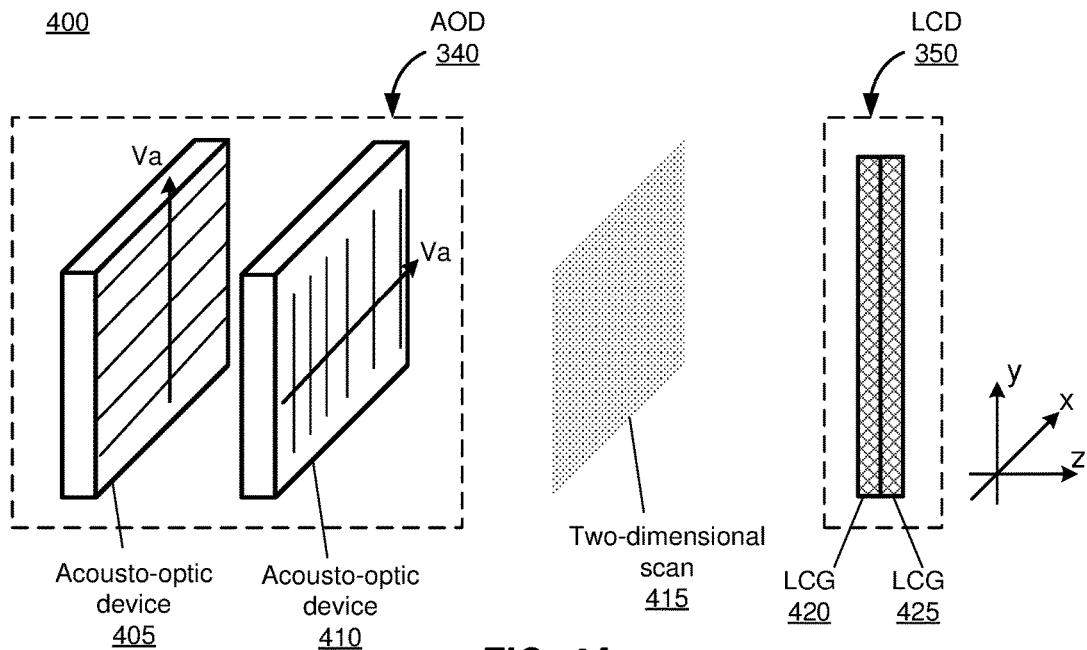
FIG. 4A illustrates a first configuration of a structured light generator including two liquid crystal gratings (LCGs), in accordance with an embodiment.

FIG. 4A illustrates a first configuration 400 of the structured light generator 305 that includes two LCGs 420, 425, in accordance with an embodiment. In the first configuration 400, the AOD 340 includes a pair of acousto-optic devices 405, 410. Each acousto-optic device 405, 410 has an axis of orientation that controls an orientation of diffraction by the acousto-optic device 405, 410. Axes of orientation associated with the pair of acousto-optic devices 405, 410 are orthogonal to each other. Accordingly, the acousto-optic device 405 diffracts light in one dimension (e.g., x) and the acousto-optic device 410 diffracts the x-diffracted light along an orthogonal dimension (e.g., y), thereby generating a two-dimensional scanning pattern 415 for two-dimensional random scanning.

Based on a driving signal having a specific radio frequency applied to each acousto-optic device 405, 410 (e.g., controlled based in part on the emission instructions from the controller 315), an acoustic wave is launched by a transducer in each acousto-optic device 405, 410. A direction of vector Va shown in FIG. 4A indicates a direction of an acoustic wave propagating inside a crystal in each acousto-optic device 405, 410. Since acoustic waves in the acousto-optic devices 405, 410 propagate in crossed (orthogonal) directions, the pair of acousto-optic devices 405, 410 generates the diffracted scanning beams 345 as the two-dimensional scanning pattern 415, e.g., a dot pattern. In one embodiment, each acousto-optic device 405, 410 is implemented as a thin film device, having a thickness of approximately a few hundred μm. In another embodiment, each acousto-optic device 405, 410 is implemented as a plate device, having a thickness of approximately a few mm. In yet another embodiment, each acousto-optic device 405, 410 is implemented as a bulk device, having a thickness between approximately 5 mm and 10 mm.

As further shown in FIG. 4A, the first configuration 400 of the structured light generator 305 in FIG. 3 includes the LCD 350 that comprises the pair of LCGs 420, 425 for expanding scanning angles of the two-dimensional scanning pattern 415 produced by the pair of acousto-optic devices 405, 410. In some embodiments, each LCG 420, 425 is implemented as a one-dimensional grating, thus expanding a scanning field in a particular dimension. In one embodiment, each LCG 420, 425 expands a scanning field of the two-dimensional scanning pattern 415 to N degrees along a corresponding dimension, e.g., to N=60 degrees. In another embodiment, an amount of diffraction from each LCG 420, 425 is different from one another. For example, the LCG 420 may expand a scanning field to N degrees along x dimension, the LCG 425 may expand a scanning field to M degrees along y dimension, where N is different than M. In alternate embodiments, both LCGs 420, 425 expand a scanning field of the two-dimensional scanning pattern 415 along the same dimension. In this way, for example, a cumulative increase is achieved for a field-of-view in x dimension, but a field-of-view in y dimension is that of the AOD 340. In some embodiments, a thickness of each LCG 420, 425 is between approximately 100 μm and 500 μm. In some embodiments, the LCGs 420, 425 are sandwiched together virtually without any space between the LCG 420 and the LCG 425, as shown in FIG. 4A. In alternate embodiments, the LCG 420 is coupled to the LCG 425 with a defined space between the LCG 420 and the LCG 425. In one embodiment, the defined spaced between the LCG 420 and the LCG 425 is filled with an indexed matched material so that the LCGs 420, 425 operate in the Bragg regime. In an alternate embodiment, there is an air gap between the LCG 420 and the LCG 425. In some embodiments, the LCGs 420, 425 are implemented to satisfy the Bragg matching condition for maximizing diffraction efficiency and achieving a preferred degree of polarization associated with the structured light 355.

Figure 4B:
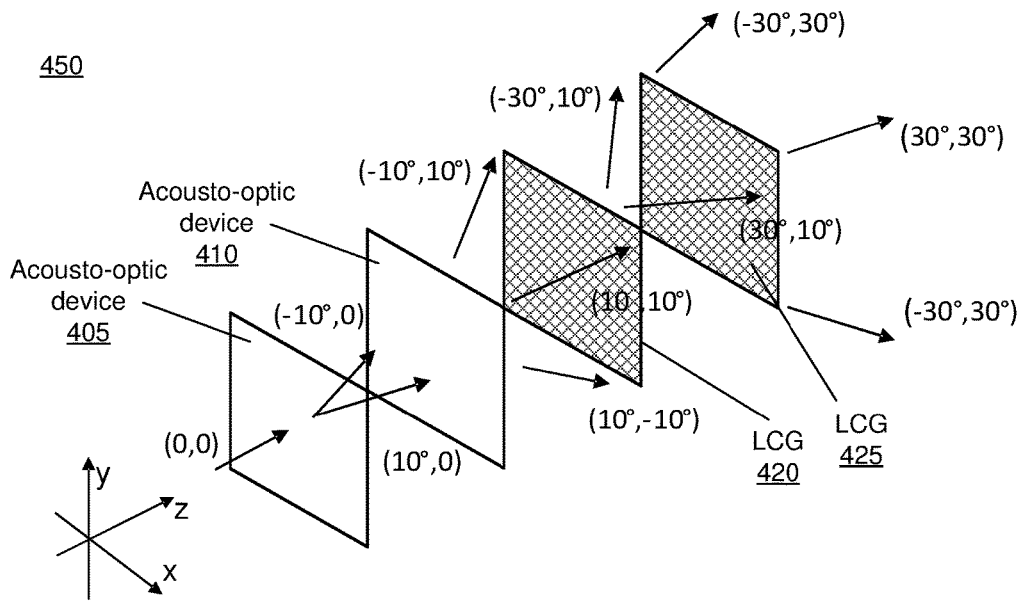
FIG. 4B illustrates an example creation of scanning light beams by using the first configuration of the structured light generator in FIG. 4A, in accordance with an embodiment.

FIG. 4B illustrates an example 450 of creating the structured light 355 by utilizing the first configuration 400 in FIG. 4A of the structured light generator 305, in accordance with an embodiment. As shown in FIG. 4B, the acousto-optic device 405 diffracts incident light (e.g., the one or more optical beams 330 in FIG. 3) along one dimension (e.g., along x dimension) providing a scanning field between, e.g., −10 degrees and +10 degrees along x dimension. The acousto-optic device 410 diffracts the x-diffracted light along an orthogonal y dimension, thereby generating the diffracted scanning beams 345 having a scanning field between, e.g., −10 degrees and +10 degrees along both x and y dimensions. In the illustrative embodiment of FIG. 4B, the LCG 420 expands scanning angles of the scanning beams between, e.g., −30 degrees and +30 degrees along x dimension; the LCG 425 further expands a scanning field to cover, e.g., −30 degrees and +30 degrees along both x and y dimensions.

Figure 5A:
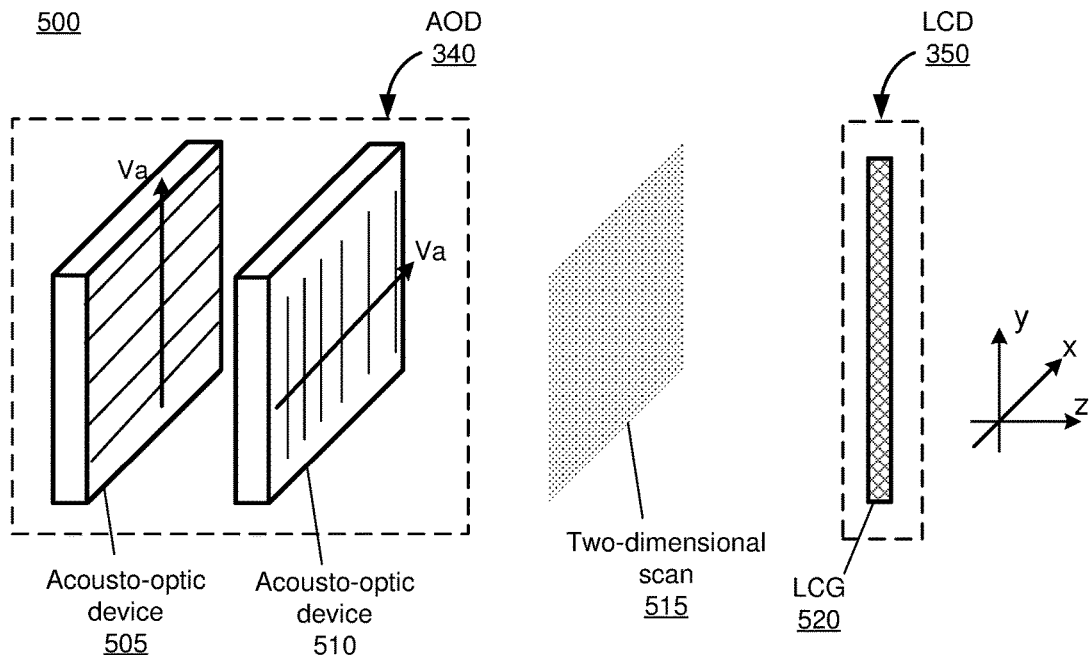
FIG. 5A illustrates a second configuration of a structured light generator including a single LCG, in accordance with an embodiment.

FIG. 5A illustrates a second configuration 500 of the structured light generator 305 that includes a single LCG 520, in accordance with an embodiment. In the second configuration 500, the AOD 340 includes a pair of acousto-optic devices 505, 510, which may be configured in a similar manner as the pair of acousto-optic devices 405, 410 of the first configuration 400 in FIG. 4A. Thus, each acousto-optic device 505, 510 has an axis of orientation that controls an orientation of diffraction by the acousto-optic device 505, 510. Axes of orientation associated with the pair of acousto-optic devices 505, 510 are orthogonal to each other. Accordingly, the acousto-optic device 505 diffracts light in one dimension (e.g., x) and the acousto-optic device 510 diffracts the x-diffracted light along an orthogonal dimension (e.g., y), thereby generating a two-dimensional scanning pattern 515 for two-dimensional random scanning. In one embodiment, each acousto-optic device 505, 510 is implemented as a thin film device, having a thickness of approximately a few hundred μm. In another embodiment, each acousto-optic device 505, 510 is implemented as a plate device, having a thickness of approximately a few mm. In yet another embodiment, each acousto-optic device 505, 510 is implemented as a bulk device, having a thickness between approximately 5 mm and 10 mm.

As further shown in FIG. 5A, the second configuration 500 of the structured light generator 305 in FIG. 3 includes the LCD 350 implemented based on the single LCG 520 for expanding scanning angles of the two-dimensional scanning pattern 515 produced by the pair of acousto-optic devices 505, 510. The LCG 520 is implemented as a two dimensional grating, i.e., the LCG 520 expands scanning angles of the two-dimensional scanning pattern 515 along both x and y dimensions. In one embodiment, the LCG 520 expands a scanning field of the two-dimensional scanning pattern 515 to N degrees along both x and y dimension, e.g., to N=60 degrees. In another embodiment, an amount of diffraction from the LCG 520 is different along x dimension than along y dimension. In this case, the LCG 520 expands a scanning field of the two-dimensional scanning pattern 515 to N degrees along x dimension and to M degrees along y dimension, where N is different than M. In some embodiments, a thickness of the LCG 520 is between approximately 100 μm and 500 μm. In some embodiments, a thickness of the two-dimensional LCG 520 is smaller than a cumulative thickness of the one-dimensional LCGs 420, 425 in FIG. 4A.

Figure 5B:
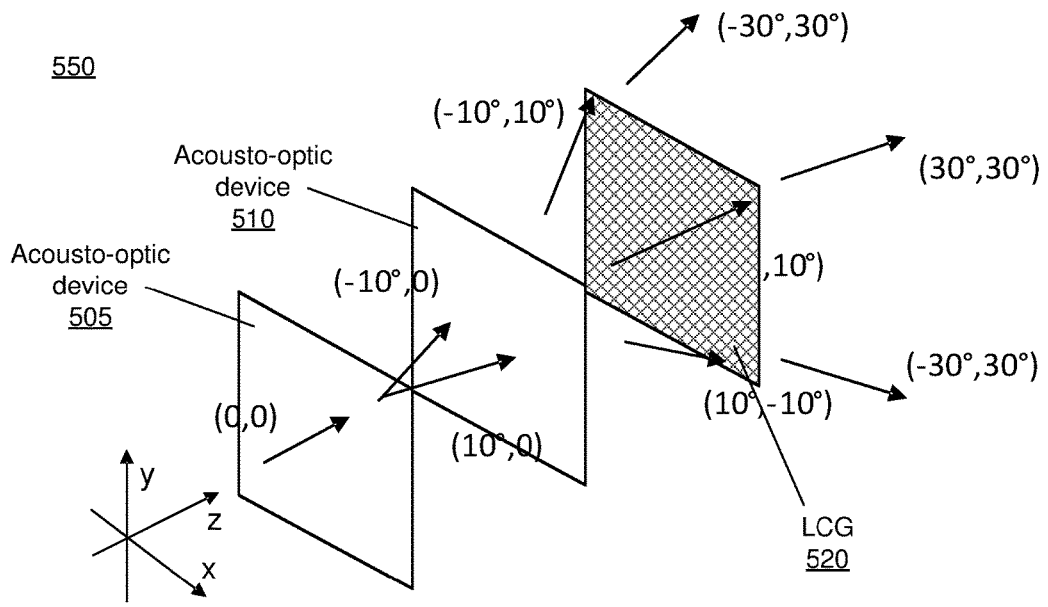
FIG. 5B illustrates an example creation of scanning light beams by using the second configuration of the structured light generator in FIG. 5A, in accordance with an embodiment.

FIG. 5B illustrates an example 550 of creating the structured light 355 by utilizing the second configuration 500 in FIG. 5A of the structured light generator 305, in accordance with an embodiment. As shown in FIG. 5B, the acousto-optic device 505 diffracts incident light (e.g., the one or more optical beams 330 in FIG. 3) along one dimension (e.g., along x dimension) providing a scanning field between, e.g., −10 degrees and +10 degrees along x dimension. The acousto-optic device 510 diffracts the x-diffracted light along an orthogonal y dimension, thereby generating the diffracted scanning beams 345 having a scanning field between, e.g., −10 degrees and +10 degrees along both x and y dimensions. In the illustrative embodiment of FIG. 5B, the two-dimensional LCG 520 expands scanning angles of the scanning beams between −30 degrees and +30 degrees along both x and y dimensions.

Figure 6A:
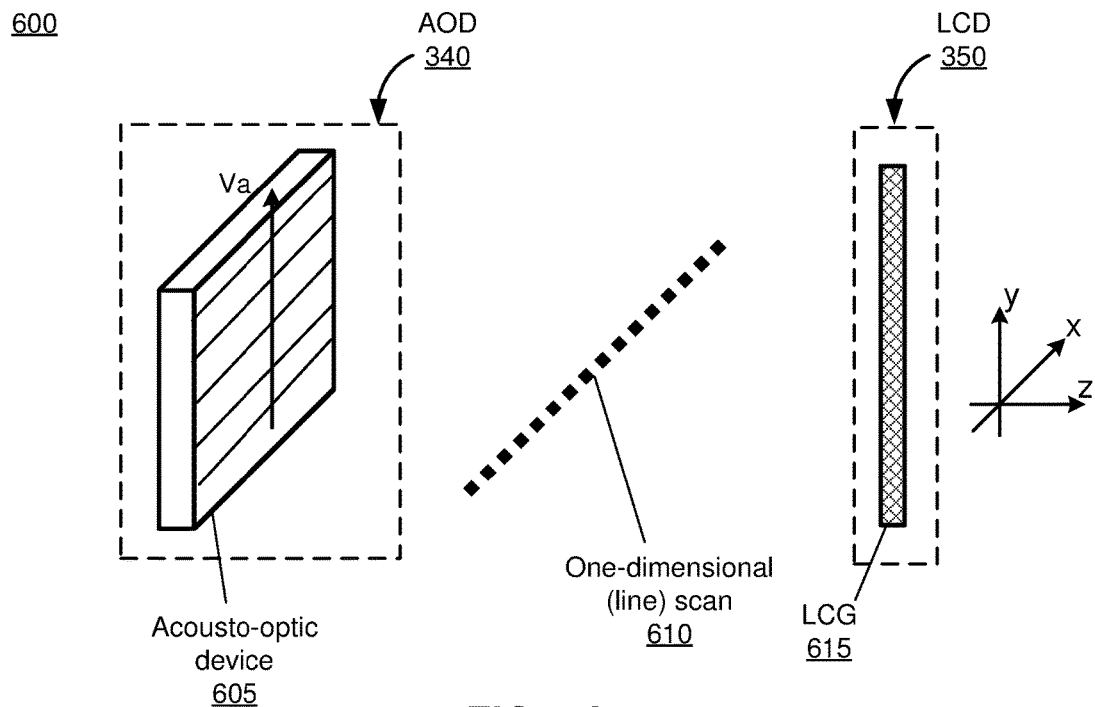
FIG. 6A illustrates a third configuration of a structured light generator including a single acousto-optic device and a single LCG, in accordance with an embodiment.

FIG. 6A illustrates a third configuration 600 of the structured light generator 305 that includes a single acousto-optic device 605 and a single LCG 615, in accordance with an embodiment. In the third configuration 600, the AOD 340 is implemented as a single acousto-optic device 605 for generating the diffracted scanning beams 345 as a one-dimensional scanning (line) pattern 610. In one embodiment, the acousto-optic device 605 is implemented as a thin film device, having a thickness of approximately a few hundred μm. In another embodiment, the acousto-optic device 605 is implemented as a plate device, having a thickness of approximately a few mm. In yet another embodiment, the acousto-optic device 605 is implemented as a bulk device, having a thickness between approximately 5 mm and 10 mm.

As further shown in FIG. 6A, the third configuration 600 of the structured light generator 305 in FIG. 3 includes the LCD 350 implemented based on the single LCG 615 for expanding scanning angles of the one-dimensional scanning pattern 610 produced by the acousto-optic device 605. The LCG 615 is implemented as a two dimensional grating, i.e., the LCG 615 expands scanning angles of the one-dimensional scanning pattern 610 along both x and y dimensions. In some embodiments, the third configuration 600 including the single acousto-optic device 605 and the single LCG 615 can be suitable for fast tracking of a small area with a narrow field-of-view that may be eventually expended, if necessary, based on the LCG 615. In one embodiment, an amount of diffraction from the LCG 615 is the same along x and y dimensions. In another embodiment, an amount of diffraction from the LCG 615 is different along x dimension than along y dimension. In general, the LCG 615 expands a scanning field of the one-dimensional scanning pattern 610 to N degrees along x dimension and to M degrees along y dimension, where N can be same or different than M. In some embodiments, a thickness of the LCG 615 is between approximately 100 μm and 500 μm. In some embodiments, a thickness of the two-dimensional LCG 615 is smaller than a cumulative thickness of the one-dimensional LCGs 420, 425 in FIG. 4A.

Figure 6B:
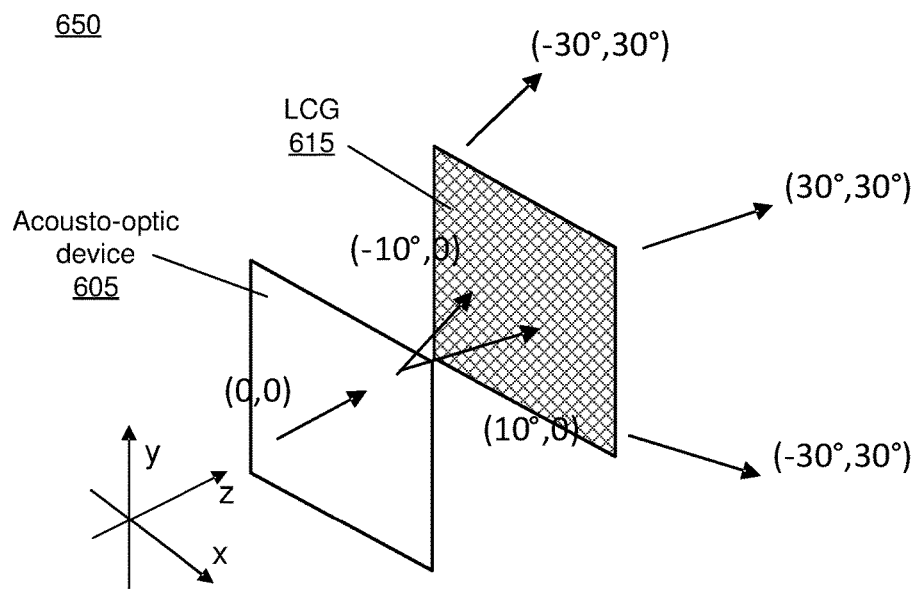
FIG. 6B illustrates an example creation of scanning light beams by using the third configuration of the structured light generator in FIG. 6A, in accordance with an embodiment.

FIG. 6B illustrates an example 650 of creating the structured light 355 by utilizing the third configuration 600 in FIG. 6A of the structured light generator 305, in accordance with an embodiment. As shown in FIG. 6B, the acousto-optic device 605 diffracts incident light (e.g., the one or more optical beams 330 in FIG. 3) along one dimension (e.g., along x dimension) providing scanning beams having a scanning field between, e.g., −10 degrees and +10 degrees along x dimension. The two-dimensional LCG 615 provides two-dimensional scanning by expanding scanning angles of the one-dimensional scanning beams between, e.g., −30 degrees and +30 degrees along both x and y dimensions. Thus, in the illustrative embodiment of FIG. 6B, an amount of diffraction from the LCG 615 is larger along y dimension than along x dimension in order to turn a line-shaped field-of-view of the one-dimensional scanning beams into a square field-of-view of the structured light 355.

Figure 7:
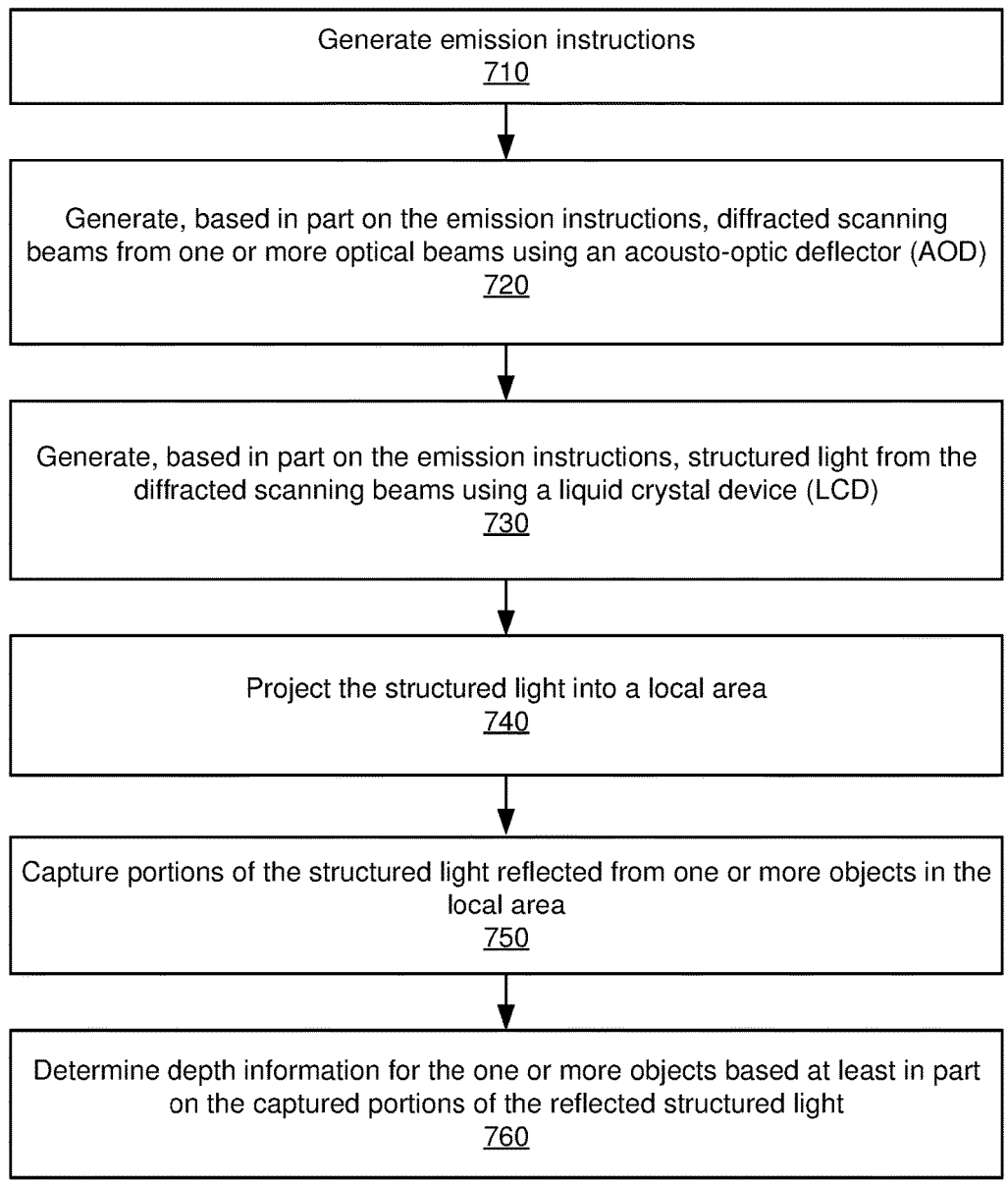
FIG. 7 is a flow chart illustrating a process of determining depth information of objects in a local area, in accordance with an embodiment.

FIG. 7 is a flow chart illustrating a process 700 of determining depth information of objects in a local area, in accordance with an embodiment. The process 700 of FIG. 7 may be performed by the components of a DCA (e.g., the DCA 300). Other entities (e.g., a HMD and/or console) may perform some or all of the steps of the process in other embodiments. Likewise, embodiments may include different and/or additional steps, or perform the steps in different orders.

The DCA generates 710 (e.g., via a controller) emission instructions. The DCA may provide the emission instructions to an illumination source, an AOD and a LCD within the DCA. Based on the emission instructions, the illumination source may emit one or more optical beams. In some embodiments, the DCA generates the emission instructions which include information about a radio frequency. Responsive to the radio frequency in the emission instructions, the DCA generates a sound wave within the AOD to form a dynamic diffraction grating.

The DCA generates 720 (e.g., via the AOD), based in part on the emission instructions, diffracted scanning beams from one or more optical beams. The AOD functions as one or more dynamic diffraction gratings, and diffracts the one or more optical beams to form the diffracted scanning beams. In some embodiments, the DCA modifies a radio frequency in the emission instructions to adjust a diffraction angle at which the one or more optical beams are diffracted and interfered to form the diffracted scanning beams. In some embodiments, the diffracted scanning beams represent polarized structured light, e.g., a dot pattern of light having a circular polarization.

The DCA generates 730 (e.g., via the LCD), based in part on the emission instructions, structured light from the diffracted scanning beams using the LCD. The LCD includes one or more LCGs that diffract the diffracted scanning beams. Each LCG is configured to diffract the diffracted scanning beams based in part on the emission instructions to generate the structured light. Each LCG is configured to expand scanning angles of the diffracted scanning beams in at least one dimension.

The DCA projects 740 (e.g., via a projection assembly) the structured light into a local area. In some embodiments, the DCA projects 740 the structured light to illuminate a large field-of-view (e.g., up to 60 degrees along both x and y dimensions) of the local area for accurate depth scanning. The DCA may also control (e.g., via the controller) a scanning sub-zone of the large field-of-view of the local area by controlling the one or more dynamic diffraction gratings within the AOD of the DCA.

The DCA captures 750 (e.g., via an imaging device) portions of the structured light reflected from one or more objects in the local area. In some embodiments, the imaging device of the DCA includes a polarizing element and a camera, wherein the polarizing element is positioned in front of the camera. The polarizing element is configured to receive the portions of the reflected structured light having a specific polarization and to propagate the received portions of reflected polarized light to the camera. In some embodiments, the polarization of the portions of the reflected structured light is orthogonal to a polarization of the structured light.

The DCA determines 770 (e.g., via the controller) depth information for the one or more objects based at least in part on the captured portions of the reflected structured light. In some embodiments, the DCA determines 770 the depth information for the one or more objects based in part on polarization information of the captured portions of the reflected structured light.

In some embodiments, the DCA is configured as part of a HMD, e.g., the HMD 100 in FIG. 1. In one embodiment, the DCA provides the determined depth information to a console coupled to the HMD. The console is then configured to generate content for presentation on an electronic display of the HMD, based on the depth information. In another embodiment, the DCA provides the determined depth information to a module of the HMD that generates content for presentation on the electronic display of the HMD, based on the depth information. In an alternate embodiment, the DCA is integrated into a HMD as part of an AR system. In this case, the DCA may be configured to sense and display objects behind a head of a user wearing the HMD or display objects recorded previously.

System Environment

Figure 8:
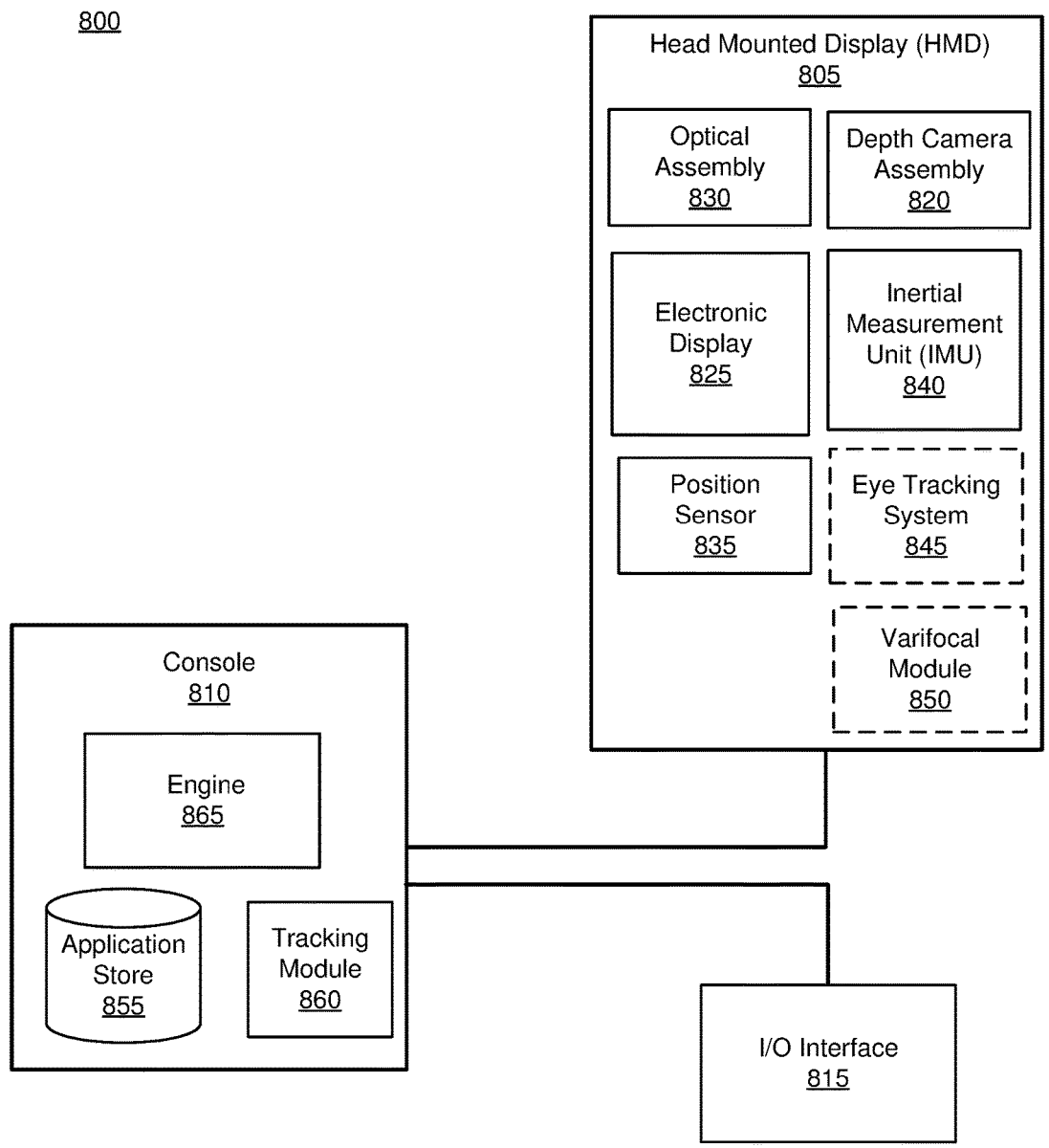
FIG. 8 is a block diagram of a HMD system in which a console operates, in accordance with an embodiment.

FIG. 8 is a block diagram of one embodiment of a HMD system 800 in which a console 810 operates. The HMD system 800 may operate in a VR system environment, an AR system environment, a MR system environment, or some combination thereof. The HMD system 800 shown by FIG. 8 comprises a HMD 805 and an input/output (I/O) interface 815 that is coupled to the console 810. While FIG. 8 shows an example HMD system 800 including one HMD 805 and on I/O interface 815, in other embodiments any number of these components may be included in the HMD system 800. For example, there may be multiple HMDs 805 each having an associated I/O interface 815, with each HMD 805 and I/O interface 815 communicating with the console 810. In alternative configurations, different and/or additional components may be included in the HMD system 800. Additionally, functionality described in conjunction with one or more of the components shown in FIG. 8 may be distributed among the components in a different manner than described in conjunction with FIG. 8 in some embodiments. For example, some or all of the functionality of the console 810 is provided by the HMD 805.

The HMD 805 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 805, the console 810, or both, and presents audio data based on the audio information. The HMD 805 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 805 is the HMD 100 described above in conjunction with FIG. 1.

The HMD 805 includes a DCA 820, an electronic display 825, an optical assembly 830, one or more position sensors 835, an IMU 840, an optional eye tracking system 845, and an optional varifocal module 850. Some embodiments of the HMD 805 have different components than those described in conjunction with FIG. 8. Additionally, the functionality provided by various components described in conjunction with FIG. 8 may be differently distributed among the components of the HMD 805 in other embodiments.

The DCA 820 captures data describing depth information of a local area surrounding some or all of the HMD 805. The DCA 820 can compute the depth information using the data (e.g., based on captured portions of structured light), or the DCA 820 can send this information to another device such as the console 810 that can determine the depth information using the data from the DCA 820.

The DCA 820 includes a structured light generator, an imaging device and a controller. The structured light generator of the DCA 820 is configured to illuminate the local area with structured light in accordance with emission instructions. The structured light generator comprises an illumination source, an AOD, a LCD, and a projection assembly. The illumination source is configured to emit one or more optical beams. The AOD generates diffracted scanning beams (in one or two dimensions) from the one or more beams emitted from the illumination source. The AOD is configured to function as one or more dynamic diffraction gratings that diffract the one or more optical beams to form the diffracted scanning beams based in part on the emission instructions. In one embodiment, the AOD includes a single acousto-optic device for generating one-dimensional scanning beams. In an alternate embodiment, the AOD includes a pair of acousto-optic devices whose axes of orientation are orthogonal to each other. Accordingly, one acousto-optic device diffracts light in one dimension (e.g., x) and the second acousto-optic device diffracts the x-diffracted light along an orthogonal dimension (e.g., y), thereby generating the scanning beams as two-dimensional scanning beams for two-dimensional random scanning. The LCD includes one or more LCGs. Each LCG is configured to diffract the diffracted scanning beams and expand scanning angles of the scanning beams based in part on the emission instructions to generate the structured light for scanning the local area with a wide field-of-view. The projection assembly is configured to project the structured light into the local area. The imaging device of the DCA 820 is configured to capture portions of the structured light reflected from one or more objects in the local area. The controller of the DCA 820 may be coupled to both the structured light generator and the imaging device. The controller generates the emission instructions and provides the emission instructions to the structured light generator. The controller is also configured to determine depth information for the one or more objects based at least in part on the captured portions of the reflected structured light. The DCA 820 is an embodiment of the DCA 240 in FIG. 2 or the DCA 300 in FIG. 3.

The electronic display 825 displays two-dimensional or three-dimensional images to the user in accordance with data received from the console 810. In various embodiments, the electronic display 825 comprises a single electronic display or multiple electronic displays (e.g., a display for each eye of a user). Examples of the electronic display 825 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optical assembly 830 magnifies image light received from the electronic display 825, corrects optical errors associated with the image light, and presents the corrected image light to a user of the HMD 805. The optical assembly 830 includes a plurality of optical elements. Example optical elements included in the optical assembly 830 include: an aperture, a Fresnel lens, a convex lens, a concave lens, a filter, a reflecting surface, or any other suitable optical element that affects image light. Moreover, the optical assembly 830 may include combinations of different optical elements. In some embodiments, one or more of the optical elements in the optical assembly 830 may have one or more coatings, such as partially reflective or anti-reflective coatings.

Magnification and focusing of the image light by the optical assembly 830 allows the electronic display 825 to be physically smaller, weigh less and consume less power than larger displays. Additionally, magnification may increase the field-of-view of the content presented by the electronic display 825. For example, the field-of-view of the displayed content is such that the displayed content is presented using almost all (e.g., approximately 110 degrees diagonal), and in some cases all, of the user's field-of-view. Additionally in some embodiments, the amount of magnification may be adjusted by adding or removing optical elements.

In some embodiments, the optical assembly 830 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 825 for display is pre-distorted, and the optical assembly 830 corrects the distortion when it receives image light from the electronic display 825 generated based on the content.

The IMU 840 is an electronic device that generates data indicating a position of the HMD 805 based on measurement signals received from one or more of the position sensors 835 and from depth information received from the DCA 820. A position sensor 835 generates one or more measurement signals in response to motion of the HMD 805. Examples of position sensors 835 include: one or more accelerometers, one or more gyroscopes, one or more magnetometers, another suitable type of sensor that detects motion, a type of sensor used for error correction of the IMU 840, or some combination thereof. The position sensors 835 may be located external to the IMU 840, internal to the IMU 840, or some combination thereof.

Based on the one or more measurement signals from one or more position sensors 835, the IMU 840 generates data indicating an estimated current position of the HMD 805 relative to an initial position of the HMD 805. For example, the position sensors 835 include multiple accelerometers to measure translational motion (forward/back, up/down, left/right) and multiple gyroscopes to measure rotational motion (e.g., pitch, yaw, roll). In some embodiments, the IMU 840 rapidly samples the measurement signals and calculates the estimated current position of the HMD 805 from the sampled data. For example, the IMU 840 integrates the measurement signals received from the accelerometers over time to estimate a velocity vector and integrates the velocity vector over time to determine an estimated current position of a reference point on the HMD 805. Alternatively, the IMU 840 provides the sampled measurement signals to the console 810, which interprets the data to reduce error. The reference point is a point that may be used to describe the position of the HMD 805. The reference point may generally be defined as a point in space or a position related to the HMD's 805 orientation and position.

The IMU 840 receives one or more parameters from the console 810. The one or more parameters are used to maintain tracking of the HMD 805. Based on a received parameter, the IMU 840 may adjust one or more IMU parameters (e.g., sample rate). In some embodiments, certain parameters cause the IMU 840 to update an initial position of the reference point so it corresponds to a next position of the reference point. Updating the initial position of the reference point as the next calibrated position of the reference point helps reduce accumulated error associated with the current position estimated the IMU 840. The accumulated error, also referred to as drift error, causes the estimated position of the reference point to "drift" away from the actual position of the reference point over time. In some embodiments of the HMD 805, the IMU 840 may be a dedicated hardware component. In other embodiments, the IMU 840 may be a software component implemented in one or more processors.

In some embodiments, the eye tracking system 845 is integrated into the HMD 805. The eye tracking system 845 determines eye tracking information associated with an eye of a user wearing the HMD 805. The eye tracking information determined by the eye tracking system 845 may comprise information about an orientation of the user's eye, i.e., information about an angle of an eye-gaze. In some embodiments, the eye tracking system 845 is integrated into the optical assembly 830. An embodiment of the eye-tracking system 845 may comprise an illumination source and an imaging device (camera).

In some embodiments, the varifocal module 850 is further integrated into the HMD 805. The varifocal module 850 may be coupled to the eye tracking system 845 to obtain eye tracking information determined by the eye tracking system 845. The varifocal module 850 may be configured to adjust focus of one or more images displayed on the electronic display 825, based on the determined eye tracking information obtained from the eye tracking system 845. In this way, the varifocal module 850 can mitigate vergence-accommodation conflict in relation to image light. The varifocal module 850 can be interfaced (e.g., either mechanically or electrically) with at least one of the electronic display 825 and at least one optical element of the optical assembly 830. Then, the varifocal module 850 may be configured to adjust focus of the one or more images displayed on the electronic display 825 by adjusting position of at least one of the electronic display 825 and the at least one optical element of the optical assembly 830, based on the determined eye tracking information obtained from the eye tracking system 845. By adjusting the position, the varifocal module 850 varies focus of image light output from the electronic display 825 towards the user's eye. The varifocal module 850 may be also configured to adjust resolution of the images displayed on the electronic display 825 by performing foveated rendering of the displayed images, based at least in part on the determined eye tracking information obtained from the eye tracking system 845. In this case, the varifocal module 850 provides appropriate image signals to the electronic display 825. The varifocal module 850 provides image signals with a maximum pixel density for the electronic display 825 only in a foveal region of the user's eye-gaze, while providing image signals with lower pixel densities in other regions of the electronic display 825. In one embodiment, the varifocal module 850 may utilize the depth information obtained by the DCA 820 to, e.g., generate content for presentation on the electronic display 825.

The I/O interface 815 is a device that allows a user to send action requests and receive responses from the console 810. An action request is a request to perform a particular action. For example, an action request may be an instruction to start or end capture of image or video data or an instruction to perform a particular action within an application. The I/O interface 815 may include one or more input devices. Example input devices include: a keyboard, a mouse, a game controller, or any other suitable device for receiving action requests and communicating the action requests to the console 810. An action request received by the I/O interface 815 is communicated to the console 810, which performs an action corresponding to the action request. In some embodiments, the I/O interface 815 includes an IMU 840 that captures calibration data indicating an estimated position of the I/O interface 815 relative to an initial position of the I/O interface 815. In some embodiments, the I/O interface 815 may provide haptic feedback to the user in accordance with instructions received from the console 810. For example, haptic feedback is provided when an action request is received, or the console 810 communicates instructions to the I/O interface 815 causing the I/O interface 815 to generate haptic feedback when the console 810 performs an action.

The console 810 provides content to the HMD 805 for processing in accordance with information received from one or more of: the DCA 820, the HMD 805, and the I/O interface 815. In the example shown in FIG. 8, the console 810 includes an application store 855, a tracking module 860, and an engine 865. Some embodiments of the console 810 have different modules or components than those described in conjunction with FIG. 8. Similarly, the functions further described below may be distributed among components of the console 810 in a different manner than described in conjunction with FIG. 8.

The application store 855 stores one or more applications for execution by the console 810. An application is a group of instructions, that when executed by a processor, generates content for presentation to the user. Content generated by an application may be in response to inputs received from the user via movement of the HMD 805 or the I/O interface 815. Examples of applications include: gaming applications, conferencing applications, video playback applications, or other suitable applications.

The tracking module 860 calibrates the HMD system 800 using one or more calibration parameters and may adjust one or more calibration parameters to reduce error in determination of the position of the HMD 805 or of the I/O interface 815. For example, the tracking module 860 communicates a calibration parameter to the DCA 820 to adjust the focus of the DCA 820 to more accurately determine positions of structured light elements captured by the DCA 820. Calibration performed by the tracking module 860 also accounts for information received from the IMU 840 in the HMD 805 and/or an IMU 840 included in the I/O interface 815. Additionally, if tracking of the HMD 805 is lost (e.g., the DCA 820 loses line of sight of at least a threshold number of structured light elements), the tracking module 860 may re-calibrate some or all of the HMD system 800.

The tracking module 860 tracks movements of the HMD 805 or of the I/O interface 815 using information from the DCA 820, the one or more position sensors 835, the IMU 840 or some combination thereof. For example, the tracking module 850 determines a position of a reference point of the HMD 805 in a mapping of a local area based on information from the HMD 805. The tracking module 860 may also determine positions of the reference point of the HMD 805 or a reference point of the I/O interface 815 using data indicating a position of the HMD 805 from the IMU 840 or using data indicating a position of the I/O interface 815 from an IMU 840 included in the I/O interface 815, respectively. Additionally, in some embodiments, the tracking module 860 may use portions of data indicating a position or the HMD 805 from the IMU 840 as well as representations of the local area from the DCA 820 to predict a future location of the HMD 805. The tracking module 860 provides the estimated or predicted future position of the HMD 805 or the I/O interface 815 to the engine 855.

The engine 865 generates a 3D mapping of the area surrounding some or all of the HMD 805 (i.e., the "local area") based on information received from the HMD 805. In some embodiments, the engine 865 determines depth information for the 3D mapping of the local area based on information received from the DCA 820 that is relevant for techniques used in computing depth. The engine 865 may calculate depth information using one or more techniques in computing depth from polarized structured light. In various embodiments, the engine 865 uses the depth information to, e.g., update a model of the local area, and generate content based in part on the updated model.

The engine 865 also executes applications within the HMD system 800 and receives position information, acceleration information, velocity information, predicted future positions, or some combination thereof, of the HMD 805 from the tracking module 860. Based on the received information, the engine 865 determines content to provide to the HMD 805 for presentation to the user. For example, if the received information indicates that the user has looked to the left, the engine 865 generates content for the HMD 805 that mirrors the user's movement in a virtual environment or in an environment augmenting the local area with additional content. Additionally, the engine 865 performs an action within an application executing on the console 810 in response to an action request received from the I/O interface 815 and provides feedback to the user that the action was performed. The provided feedback may be visual or audible feedback via the HMD 805 or haptic feedback via the I/O interface 815.

In some embodiments, based on the eye tracking information (e.g., orientation of the user's eye) received from the eye tracking system 845, the engine 865 determines resolution of the content provided to the HMD 805 for presentation to the user on the electronic display 825. The engine 865 provides the content to the HMD 605 having a maximum pixel resolution on the electronic display 825 in a foveal region of the user's gaze, whereas the engine 865 provides a lower pixel resolution in other regions of the electronic display 825, thus achieving less power consumption at the HMD 805 and saving computing cycles of the console 810 without compromising a visual experience of the user. In some embodiments, the engine 865 can further use the eye tracking information to adjust where objects are displayed on the electronic display 825 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A depth camera assembly (DCA) comprising:
   a structured light generator configured to illuminate a local area with structured light in accordance with emission instructions, the structured light generator comprising:
      an illumination source configured to emit one or more optical beams,
      an acousto-optic deflector (AOD) that generates, based in part on the emission instructions, diffracted scanning beams from the one or more optical beams, the AOD functions as one or more dynamic diffraction gratings that diffract the one or more optical beams to form the diffracted scanning beams,
      a liquid crystal device (LCD) that generates, based in part on the emission instructions, the structured light from the diffracted scanning beams, the LCD includes one or more liquid crystal gratings (LCGs) that diffract the diffracted scanning beams, and
      a projection assembly configured to project the structured light into the local area;
   an imaging device configured to capture portions of the structured light reflected from one or more objects in the local area; and
   a controller configured to:
      generate the emission instructions,
      provide the emission instructions to the structured light generator, and
      determine depth information for the one or more objects based at least in part on the captured portions of the reflected structured light.

2. The DCA of claim 1, wherein the AOD includes a plurality of acousto-optic devices configured to function as a plurality of dynamic diffraction gratings diffracting the one or more optical beams incident to the plurality of dynamic diffraction gratings at an angle that satisfies the Bragg matching condition to form the diffracted scanning beams based in part on the emission instructions.

3. The DCA of claim 1, wherein:
   the AOD includes a single acousto-optic device;
   the LCD includes a single LCG of the one or more LCGs coupled to the single acousto-optic device; and
   the single LCG is configured to expand scanning angles of the diffracted scanning beams along a first dimension and along a second dimension orthogonal to the first dimension to generate the structured light.

4. The DCA of claim 1, wherein the AOD includes at least one pair of acousto-optic devices configured to function as at least one pair of dynamic diffraction gratings whose axes of orientation are orthogonal to each other, the at least one pair of acousto-optic devices generating the diffracted scanning beams as two-dimensional scanning beams.

5. The DCA of claim 4, wherein:
   the controller is further configured to:
      create the emission instructions which include at least one first radio frequency at which a first acousto-optic device of the at least one pair of acousto-optic devices is driven and at least one second radio frequency at which a second acousto-optic device of the at least one pair of acousto-optic devices is driven, and
      modify the at least one first radio frequency and the at least one second radio frequency to adjust a diffraction angle of the first acousto-optic device and a diffraction angle of the second acousto-optic device to form the diffracted scanning beams,
   wherein the first acousto-optic device includes at least one first transducer and at least one first diffraction area, and responsive to the at least one first radio frequency in the emission instructions, the at least one first transducer is configured to generate at least one first sound wave in the at least one first diffraction area propagating in a first direction to form a first dynamic diffraction grating of the one or more dynamic diffraction gratings, and
   the second acousto-optic device includes at least one second transducer and at least one second diffraction area, and responsive to the at least one second radio frequency in the emission instructions, the at least one second transducer is configured to generate at least one second sound wave in the at least one second diffraction area propagating in a second direction orthogonal to the first direction to form a second dynamic diffraction grating of the one or more dynamic diffraction gratings.

6. The DCA of claim 4, wherein:
   the LCD includes a first LCG and a second LCG of the one or more LCGs coupled to the at least one pair of acousto-optic devices;
   the first LCG is configured to expand scanning angles of the diffracted scanning beams along a first dimension; and
   the second LCG is configured to expand scanning angles of the diffracted scanning beams along a second dimension orthogonal to the first dimension to generate the structured light.

7. The DCA of claim 4, wherein:
   the LCD includes a single LCG of the one or more LCGs coupled to the at least one pair of acousto-optic devices; and
   the single LCG is configured to expand scanning angles of the diffracted scanning beams along a first dimension and along a second dimension orthogonal to the first dimension to generate the structured light.

8. The DCA of claim 1, wherein the AOD includes one or more acousto-optic devices, each acousto-optic device in the AOD implemented as a thin film acousto-optic device.

9. The DCA of claim 1, wherein the AOD includes one or more acousto-optic devices, each acousto-optic device in the AOD implemented as a plate acousto-optic device.

10. The DCA of claim 1, wherein the AOD includes one or more acousto-optic devices, each acousto-optic device in the AOD implemented as a bulk acousto-optic device.

11. The DCA of claim 1, wherein the one or more optical beams are incident on the AOD at an angle that satisfies the Bragg matching condition.

12. The DCA of claim 1, wherein the one or more optical beams are temporally modulated providing the structured light to be temporally modulated.

13. The DCA of claim 1, wherein the controller is further configured to determine the depth information based on at least one of: information about a pattern of the reflected structured light distorted by shapes of the one or more objects, and time-of-flight information associated with the reflected structured light.

14. The DCA of claim 1, wherein the imaging device includes:
   a camera; and
   a polarizing element positioned in front of the camera, the polarizing element configured to propagate the captured portions of the reflected structured light having a polarization orthogonal to a polarization of the structured light, and the controller is further configured to determine the depth information for the one or more objects based in part on the polarization of the reflected structured light captured by the camera.

15. A method comprising:

generating emission instructions;

generating, based in part on the emission instructions, diffracted scanning beams from one or more optical beams by diffracting the one or more optical beam using an acousto-optic deflector (AOD) that functions as one or more dynamic diffraction gratings to form the diffracted scanning beams;

generating, based in part on the emission instructions, structured light from the diffracted scanning beams by diffracting the diffracted scanning beams using a liquid crystal device (LCD) comprising one or more liquid crystal gratings (LCGs);

projecting the structured light into a local area;

capturing portions of the structured light reflected from one or more objects in the local area; and determining depth information for the one or more objects based at least in part on the captured portions of the reflected structured light.

16. The method of claim 15, wherein generating the diffracted scanning beams comprises:

diffracting the one or more optical beams using a single acousto-optic device of the AOD configured to function as a dynamic diffraction grating to form the diffracted scanning beams based in part on the emission instructions.

17. The method of claim 15, wherein generating the structured light comprises:

expanding, using a single LCG of the one or more LCGs in the LCD, scanning angles of the diffracted scanning beams along a first dimension and along a second dimension orthogonal to the first dimension to form the structured light.

18. The method of claim 15, wherein generating the diffracted scanning beams comprises:

diffracting the one or more optical beams using at least one pair of acousto-optic devices of the AOD configured to function as at least one pair of dynamic diffraction gratings whose axes of orientation are orthogonal to each other to form the diffracted scanning beams as two-dimensional scanning beams.

19. The method of claim 15, wherein generating the structured light comprises:

expanding, using a first LCG of the one or more LCGs in the LCD, scanning angles of the diffracted scanning beams along a first dimension; and expanding, using a second LCG of the one or more LCGs in the LCD, scanning angles of the diffracted scanning beams along a second dimension orthogonal to the first dimension to form the structured light.

20. A head-mounted display (HMD) comprising:

a display configured to emit image light;

a structured light generator configured to illuminate a local area with structured light in accordance with emission instructions, the structured light generator comprising:

an illumination source configured to emit one or more optical beams, an acousto-optic deflector (AOD) that generates, based in part on the emission instructions, diffracted scanning beams from the one or more optical beams, the AOD functions as one or more dynamic diffraction gratings that diffract the one or more optical beams to form the diffracted scanning beams, a liquid crystal device (LCD) that generates, based in part on the emission instructions, the structured light from the diffracted scanning beams, the LCD includes one or more liquid crystal gratings (CLGs) that diffract the diffracted scanning beams, and a projection assembly configured to project the structured light into the local area;

an imaging device configured to capture portions of the structured light reflected from one or more objects in the local area;

a controller configured to:

generate the emission instructions, provide the emission instructions to the structured light generator, and determine depth information for the one or more objects based at least in part on the captured portions of the reflected structured light; and an optical assembly configured to direct the image light to an exit pupil of the HMD corresponding to a location of a user's eye, the image light comprising the determined depth information.

* * * * *